(12) United States Patent
Shibusawa

(10) Patent No.: US 7,624,419 B2
(45) Date of Patent: Nov. 24, 2009

(54) RE-TRANSMITTER AND DIGITAL BROADCAST RECEIVING SYSTEM

(75) Inventor: Toru Shibusawa, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 673 days.

(21) Appl. No.: 10/493,837

(22) PCT Filed: Oct. 29, 2002

(86) PCT No.: PCT/JP02/11247

§ 371 (c)(1),
(2), (4) Date: Apr. 28, 2004

(87) PCT Pub. No.: WO03/039136

PCT Pub. Date: May 8, 2003

(65) Prior Publication Data

US 2005/0022249 A1 Jan. 27, 2005

(30) Foreign Application Priority Data

Nov. 2, 2001 (JP) ............................ 2001-337897

(51) Int. Cl.
*H04N 7/20* (2006.01)
*H04N 7/18* (2006.01)
*H04N 7/173* (2006.01)

(52) U.S. Cl. ...................... 725/119; 725/64; 725/69; 725/71; 725/78; 725/81; 725/131

(58) Field of Classification Search .............. 725/64, 725/69, 71, 78, 81, 119, 131; 455/73
See application file for complete search history.

(56) References Cited

U.S. PATENT DOCUMENTS

| 4,317,227 | A | * | 2/1982 | Skerlos ................... 455/180.4 |
| 5,210,684 | A | * | 5/1993 | Nam ........................... 363/37 |
| 5,237,443 | A | * | 8/1993 | Kurisu et al. ................. 348/570 |
| 5,708,961 | A | * | 1/1998 | Hylton et al. ................. 725/81 |
| 5,754,943 | A | * | 5/1998 | Arai et al. ..................... 455/14 |
| 5,781,592 | A | * | 7/1998 | Masuda ....................... 375/347 |
| 5,870,665 | A | * | 2/1999 | Uchikawa ................... 455/11.1 |

(Continued)

FOREIGN PATENT DOCUMENTS

JP 2001-186073 A 7/2001

OTHER PUBLICATIONS

Patent Abstracts of Japan, Publication No. 08-65662, dated Mar. 8, 1996. Cited in the PCT search report.

(Continued)

*Primary Examiner*—Son P Huynh
(74) *Attorney, Agent, or Firm*—Westerman, Hattori, Daniels & Adrian, LLP

(57) ABSTRACT

Information indicating which of channels is selected in a digital broadcasting receiver 17 is fed from a control signal transmitter 16 to a retransmitter 14. A terrestrial wave digital broadcasting wave from a transmitting station is inputted to a channel selection filter 6 through an indoor receiving antenna 1 and an automatic gain controller 4 in the retransmitter 14, and only a signal having a frequency component corresponding to the channel selected by the digital broadcasting receiver 17 is extracted, and is transmitted toward the digital broadcasting receiver 17 by a retransmission indoor antenna 13 through a variable gain amplifier 7.

11 Claims, 3 Drawing Sheets

U.S. PATENT DOCUMENTS

| | | | |
|---|---|---|---|
| 5,880,721 A * | 3/1999 | Yen | 725/81 |
| 6,021,119 A * | 2/2000 | Derks et al. | 370/261 |
| 6,078,783 A * | 6/2000 | Kawamura et al. | 725/120 |
| 6,128,352 A * | 10/2000 | Maeda | 375/316 |
| 6,259,891 B1 * | 7/2001 | Allen | 455/3.02 |
| 6,263,503 B1 * | 7/2001 | Margulis | 725/81 |
| 6,400,421 B1 * | 6/2002 | Sakakibara | 348/732 |
| 6,400,422 B1 * | 6/2002 | Nakamura | 348/732 |
| 6,434,374 B1 * | 8/2002 | Muterspaugh | 455/234.1 |
| 6,526,580 B2 * | 2/2003 | Shimomura et al. | 725/63 |
| 6,647,015 B2 * | 11/2003 | Malkemes et al. | 370/401 |
| 6,690,657 B1 * | 2/2004 | Lau et al. | 370/315 |
| 6,915,529 B1 * | 7/2005 | Suematsu et al. | 725/78 |
| 6,996,837 B1 * | 2/2006 | Miura et al. | 725/78 |
| 7,020,890 B1 * | 3/2006 | Suematsu et al. | 725/78 |
| 7,137,138 B2 * | 11/2006 | Shibata et al. | 725/81 |
| 2001/0027119 A1 * | 10/2001 | Furutani et al. | 455/553 |
| 2002/0038459 A1 * | 3/2002 | Talmola et al. | 725/81 |
| 2002/0059642 A1 * | 5/2002 | Russ et al. | 725/135 |
| 2002/0075106 A1 * | 6/2002 | Okubora et al. | 333/247 |
| 2002/0196843 A1 * | 12/2002 | Ben-Bassat et al. | 375/219 |
| 2004/0255326 A1 * | 12/2004 | Hicks et al. | 725/81 |
| 2006/0080707 A1 * | 4/2006 | Laksono | 725/38 |

OTHER PUBLICATIONS

Patent Abstracts of Japan, Publication No. 11-298421, dated Oct. 29, 1999. Cited in the PCT search report.

Patent Abstracts of Japan, Publication No. 2000-115044, dated Apr. 21, 2000. Cited in the PCT search report.

The International Preliminary Examination Report issued by the International Bureau of WIPO on Jun. 17, 2004.

* cited by examiner

RE-TRANSMITTER AND DIGITAL BROADCAST RECEIVING SYSTEM

TECHNICAL FIELD

The present invention relates to a retransmitter that receives digital broadcasting and retransmits the received digital broadcasting to a digital broadcasting receiver, and a digital broadcasting receiving system.

BACKGROUND ART

In a digital broadcasting system, a video/audio signal is compressed using a digital signal compression technique, and a stream (a transport stream) obtained by subjecting video/audio digital signals in a plurality of programs to time-division multiplexing is broadcast. On the other hand, a broadcasting receiver that receives such digital broadcasting selects one of a plurality of channels in digital broadcasting received through an antenna by a tuner, selects one of a plurality of programs included in the one channel by demultiplexing processing, and decodes a digital signal on the selected channel to output a video/audio signal.

When terrestrial wave digital broadcasting is received, a usage way in which an indoor antenna is used is assumed. However, it is expected that a receiving error occurs because a sufficient quality of a receiving signal is not obtained depending on the positional relationship among the indoor antenna, a window of a house, and a transmitting station. Therefore, it is considered that a retransmitter (repeater) is placed at the window of the house, for example, to amplify a digital broadcasting wave received by an antenna of the retransmitter and emit the amplified digital broadcasting wave toward the indoor antenna of the digital broadcasting receiver.

When such retransmission is made, however, oscillation easily occurs by coupling an input and an output. Therefore, the distance between a receiving antenna and a transmission antenna must be increased, thereby increasing the size of the retransmitter. Further, it is considered that retransmission is made at a frequency different from a broadcasting frequency. However, a digital broadcasting signal is fed with service information added thereto. When the frequency is changed by retransmission, the actual receiving frequency and the frequency of the service information do not coincide with each other on the side of the receiver. Consequently, the service information must be rewritten and retransmitted by the retransmitter, so that the configuration becomes complicated, resulting in increased cost.

In view of the foregoing circumstances, an object of the present invention is to provide a retransmitter and a digital broadcasting receiving system that can suitably make retransmission without changing a frequency.

DISCLOSURE OF INVENTION

In order to solve the above-mentioned problem, a retransmitter according to the present invention is characterized by comprising a high-frequency input unit to which a receiving antenna for receiving a digital broadcasting wave is connected, a high-frequency output unit to which a retransmission antenna for retransmitting the digital broadcasting wave is connected, means for acquiring a frequency selection signal which is a signal fed from a digital broadcasting receiver and corresponds to indication as to which channel is selected by the digital broadcasting receiver, and selecting and feeding means for selecting, out of high-frequency signals inputted from the high-frequency input unit, the high-frequency signal having a frequency corresponding to the frequency selection signal and feeding the selected high frequency signal to the high-frequency output unit.

In the above-mentioned configuration, when the channel is selected in the digital broadcasting receiver, the selected channel is recognized on the side of the retransmitter, and the high-frequency signal (digital broadcasting wave) having the frequency corresponding to the selected channel out of the high-frequency signals inputted from the high-frequency input unit is selected and fed to the high-frequency output unit, and is fed to the digital broadcasting receiver by the retransmission antenna.

The retransmitted may be so configured that an indoor receiving antenna is mounted as the receiving antenna on the high-frequency input unit, the retransmission antenna is mounted on the high-frequency output unit, and the respective directions of polarization of the indoor receiving antenna and the retransmission antenna are perpendicular to each other. The retransmitter may be so configured that an indoor receiving antenna is mounted as the receiving antenna on the high-frequency input unit, the retransmission antenna is mounted on the high-frequency output unit, and the indoor receiving antenna and the retransmission antenna are arranged with a conductor interposed therebetween such that the respective directions of transmission are opposite to each other.

The selecting and feeding means may comprise first gain control means for making the level of the high-frequency signal inputted from the high-frequency input unit constant, a pass frequency variable filter for selecting the high-frequency signal having the frequency corresponding to the frequency selection signal, and second gain control means for controlling transmission power of the selected high-frequency signal.

The retransmitter may be so configured as to further comprise means for acquiring an ON/OFF control signal fed from the digital broadcasting receiver and a power switch, and as to be turned on and off under control from the digital broadcasting receiver. The retransmitter may be so configured as to further comprise means for acquiring a gain control signal fed from the digital broadcasting receiver and feeding a control signal to the second gain control means, and that the transmission power of the high-frequency signal is controlled by the second gain control means under control from the digital broadcasting receiver.

The retransmitter may be so configured that a signal from the digital broadcasting receiver is received by wireless.

Furthermore, a digital broadcasting receiving system according to the present invention is characterized by comprising any one of the above-mentioned retransmitters, and a digital broadcasting receiver having means for feeding a signal to the retransmitter.

In the digital broadcasting receiving system, the digital broadcasting receiver may comprise selecting and controlling means for performing processing for acquiring the quality of a receiving signal of a digital broadcasting wave from the retransmitter, processing for acquiring the quality of a receiving signal of a digital broadcasting wave from a transmitting station, and processing for comparing the qualities of both the receiving signals to judge which of the digital broadcasting waves is to be employed.

A digital broadcasting receiving system according to the present invention is a digital broadcasting receiving system comprising a retransmitter in which the respective directions of polarization of an indoor receiving antenna and a retransmission antenna are perpendicular to each other, and a digital broadcasting receiver having means for feeding a signal to the retransmitter, wherein the digital broadcasting receiver may comprise a receiving antenna having a first receiving element for receiving a digital broadcasting wave which is a horizontally polarized wave and a second receiving element for receiving a digital broadcasting wave which is a vertically polarized wave, and selecting and controlling means for performing processing for selecting one of the elements and acquiring the quality of the receiving signal of the digital broadcasting wave from the retransmitter, processing for selecting the other element and acquiring the quality of the receiving signal of the digital broadcasting wave from the transmitting station, and processing for comparing the qualities of both the receiving signals to judge which of the digital broadcasting waves is to be employed.

The digital broadcasting receiving system may be so configured as to store in a memory the results of judgment for each of channels by the selecting and controlling means, and utilizing, when the channel for which the results of the judgment have already been stored is selected, the results of the judgment which have already been stored, to omit the processing for the judgment by the selecting and controlling means.

BEST MODE FOR CARRYING OUT THE INVENTION

An embodiment of the present invention will be described on the basis of FIGS. 1 to 3.

Figure 1:
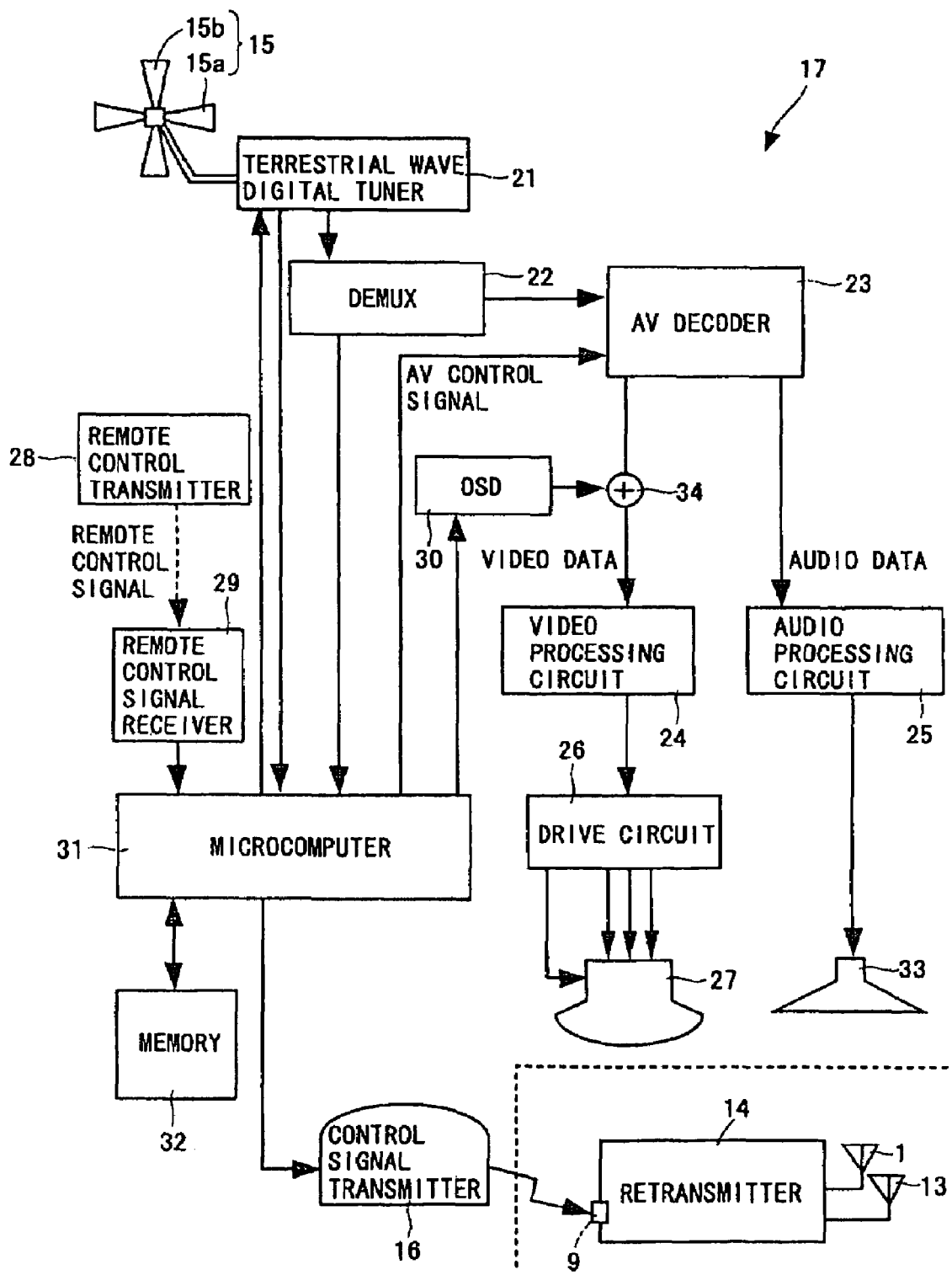
FIG. 1 is a block diagram showing, in a digital broadcasting receiving system according to an embodiment of the present invention, a digital broadcasting receiver in detail.

In FIG. 1, an indoor antenna 15 has a first receiving element 15a for receiving a digital broadcasting wave which is a horizontally polarized wave and a second receiving element 15b for receiving a digital broadcasting wave which is a vertically polarized wave. Processing for judging which of the elements feeds a receiving signal to be employed is performed by a terrestrial wave digital tuner 21 on the basis of a command from a microcomputer 31.

The terrestrial wave digital tuner 21 extracts, out of received high-frequency digital modulation signals (digital broadcasting waves), the digital modulation signal having a particular frequency. The terrestrial wave digital tuner 21 comprises a demodulation circuit, an inverse interleave circuit, an error correcting circuit, and so on, thereby demodulating the selected digital modulation signal to output a transport stream. Further, the terrestrial wave digital tuner 21 produces the C/N (carrier-to-noise ratio) or the error rate (the value of the quality of a receiving signal) of the received digital broadcasting wave, and feeds the produced C/N or error rate to the microcomputer 31.

A demultiplexer (DEMUX) 22 separates the transport stream received from the terrestrial wave digital tuner 21 into a video stream and an audio stream based on MPEG2 (Moving Picture Experts Group2) and PSI/SI (Program Specific Information/Service Information). The demultiplexer 22 feeds the video stream and the audio stream to an AV decoder 23, and feeds the PSI/SI to the microcomputer 31. A plurality of channels are multiplexed on the transport stream. Processing for selecting any of the channels can be performed by extracting from the PSI/SI data indicating which of packet IDs is used to multiplex the arbitrary channel in the transport stream. Further, the transport stream can be selected on the basis of information in the PSI/SI.

The AV decoder 23 comprises a video decoder for decoding the video stream and an audio decoder for decoding the audio stream. The video decoder decodes a variable length code which has been inputted, to find a quantization factor and a motion vector, thereby carrying out inverse DCT (Discrete Cosine Transformation), motion compensation control based on the motion vector, and the like. The audio decoder decodes a coded signal which has been inputted, to produce audio data. The video data generated by the decoding is outputted to a video processing circuit 24, and the audio data is outputted to an audio processing circuit 25.

The video processing circuit 24 receives the video data from the AV decoder 23, and subjects the received video data to digital-to-analog (D/A) conversion, to produce a video signal. The audio signal processing circuit 25 receives the audio data outputted from the AV decoder 4, and subjects the received audio data to D/A conversion, to produce an analog signal of a right (R) sound and an analog signal of a left (L) sound. A drive circuit 26 receives the video signal, and produces an RGB signal and a synchronizing signal, to drive a CRT 27. A speaker 33 receives the analog audio signal, to output an audio.

An OSD (On-Screen Display) circuit 30 outputs to an adder 34 bit map data based on character information and figure information which are instructed to output from the microcomputer 31. The adder 34 superimposes the bit map data into a video.

A remote control transmitter 28 is a transmitter for sending out a command to a broadcasting receiver 17. The remote control transmitter 28 is provided with a power key, a channel designation key, and so on. When the keys provided in the remote control transmitter 28 are operated, signal light (a remote control signal) meaning a command corresponding to the keys is sent out from a light emitter (not shown). A remote control signal receiver 29 receives the signal light, converts the received signal light into an electric signal, and feeds the electric signal to the microcomputer 31.

A memory (e.g., an EEPROM (Electrically Erasable and Programmable Memory) 32 stores various types of programs for performing predetermined operations, and others. Further, the memory 32 stores information related to the direction of polarization of a direct digital broadcasting wave from a broadcasting station (i.e., information which of the first receiving element 15a and the second receiving element 15b receives a direct digital broadcasting wave from the broadcasting station). A user can enter the information using the remote control transmitter 28, a setting switch (not shown), etc. Further, the memory 32 stores the C/N or the error rate (the value of the quality of a receiving signal) acquired by the tuner 21 for each of channels.

A control signal transmitter 16 feeds various types of control signals (e.g., an infrared signal) to a retransmitter 14 on the basis of a command from the microcomputer 31. The microcomputer 31 performs processing for driving the control signal transmitter 16 in order to control the retransmitter 14 and selection control as to whether the direct digital broadcasting wave from the broadcasting station is employed or a digital broadcasting wave from the retransmitter 14 is employed in addition to program selection processing by the user using the remote control transmitter 28 or the like. The selection control will be described in detail later.

Figure 2:
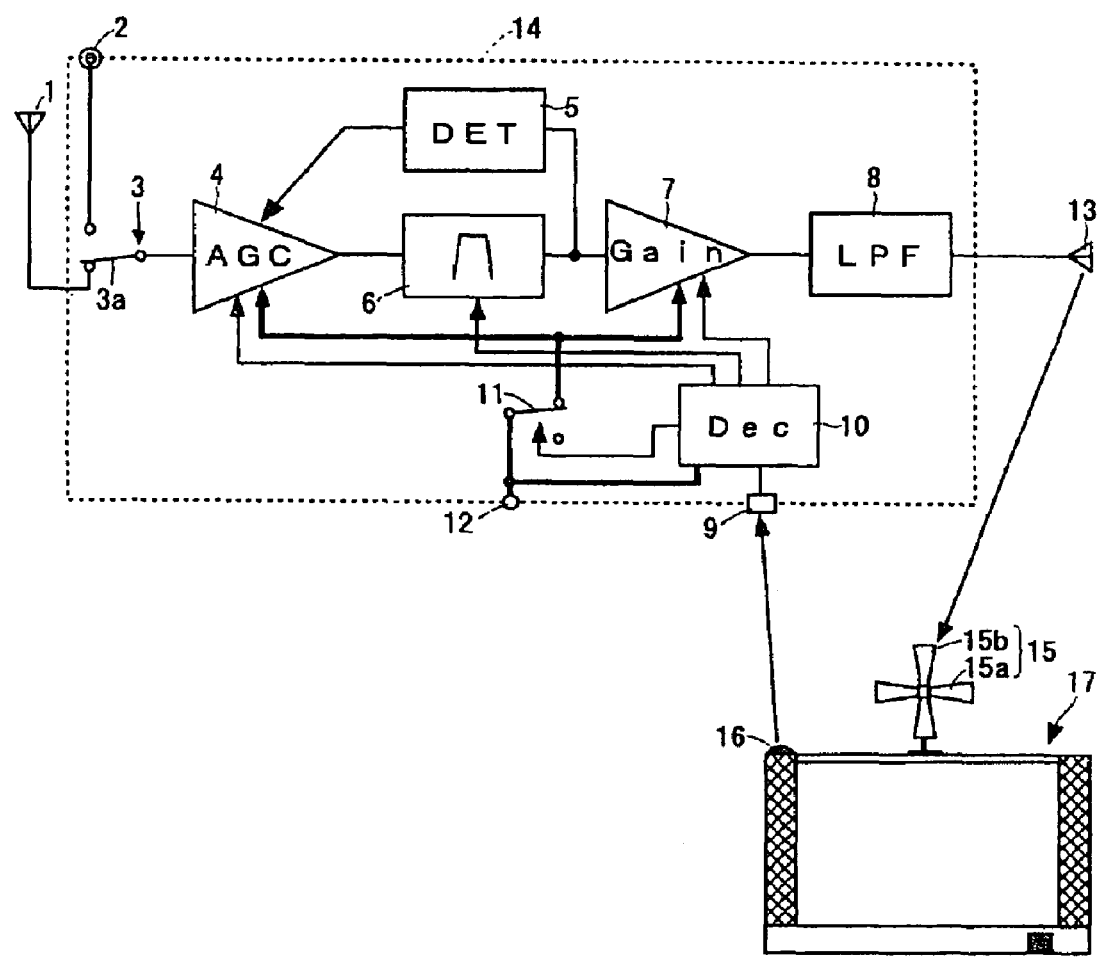
FIG. 2 is a block diagram showing, in a digital broadcasting receiving system according to an embodiment of the present invention, a retransmitter in detail.

As shown in FIG. 2, the retransmitter 14 is provided with an RF (high-frequency) input unit 3 having a switch 3*a*. The switch 3*a* has two inputs. An indoor receiving antenna 1 is connected to one of the inputs, and an outdoor receiving antenna (not shown) can be connected to the other input through an antenna connector 2. The switch 3*a* is manually operated by the user. A terrestrial wave digital broadcasting wave from a transmitting station (not shown) is converted into an electric signal by the indoor receiving antenna 1 or the outdoor receiving antenna, and the electric signal is inputted to an automatic gain controller (AGC) 4 through the RF input unit 3.

The automatic gain controller 4 is so configured as to input an output signal fed back from a detector (DET) 5, to keep the level of a receiving signal constant. Specifically, the automatic gain controller 4 cancels the level fluctuation of a transmission path between the transmitting station and the indoor receiving antenna 1 and operates such that the level of a receiving signal inputted to a channel selection filter 6 becomes constant.

The channel selection filter 6 can vary a frequency at its pass center by an applied control voltage. The control voltage is applied from a control signal demodulator (Dec) 10, and corresponds to a channel selected in the digital broadcasting receiver 17. A signal having a frequency component corresponding to the channel selected in the digital broadcasting receiver 17 is extracted by the channel selection filter 6, and is fed to a variable gain amplifier (Gain) 7.

The variable gain amplifier 7 inputs a control voltage fed by the control signal demodulator 10, amplifies the signal at a gain based on the control voltage, and feeds the amplified signal to a low-pass filter (LPF) 8. The low-pass filter (LPF) 8 reduces higher harmonics included in the signal, and feeds the signal to a retransmission indoor antenna 13. A digital broadcasting wave having a frequency component corresponding to the channel selected in the digital broadcasting receiver 17 is transmitted toward the digital broadcasting receiver 17 by the retransmission indoor antenna 13.

Figure 3:
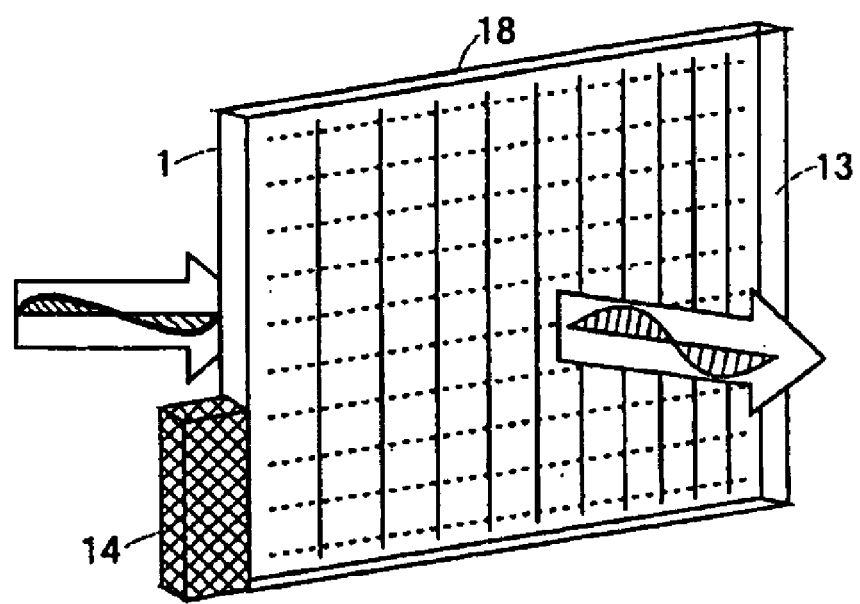
FIG. 3 is a perspective view showing an antenna attached to a retransmitter used in a digital broadcasting receiving system according to an embodiment of the present invention.

The retransmission indoor antenna 13 and the indoor receiving antenna 1 are arranged with a flat plate-shaped conductor 18 in an approximately square shape interposed therebetween such that the respective directions of transmission are opposite to each other, to configure one antenna set, as shown in FIG. 3. The respective directions of polarization of the indoor receiving antenna 1 and the retransmission indoor antenna 1 are perpendicular to each other. The retransmission device 14 is in a form in which it is accommodated in a case sealed so as not to be subjected to radio interference by transmission/receiving and is added to the antenna set.

A signal receiver 9 receives a control signal from the control signal transmitter 16 provided on the side of the digital broadcasting receiver 17, converts the received control signal into an electric signal, and feeds the electric signal to the control signal demodulator 10. The control signal demodulator 10 demodulates the received control signal to decode an instruction, to carry out ON/OFF control of a power switch 11, gain control of the variable gain amplifier 7, and change control for a frequency at the pass center of the channel selection filter 6. In order to carry out the change control for the frequency at the pass center, the retransmitter 14 may comprise a correspondence table between a control signal (a code) from the digital broadcasting receiver 17 and a control voltage value (a control voltage applied to the channel selection filter 6). Alternatively, a signal representing a control voltage value (a control voltage applied to the channel selection filter 6) itself based on the selected channel may be fed from the digital broadcasting receiver 17. The power switch 11 is a switch for choosing whether or not power from a power input unit 12 is supplied to the automatic gain controller 4 or the like (ON/OFF of the retransmitter 14). The power from the power input unit 12 is always supplied to the control signal demodulator 10 without through the power switch 11.

The control signal transmitter 16 provided on the side of the digital broadcasting receiver 17 is controlled by the microcomputer 31 contained in the digital broadcasting receiver 17. The microcomputer 31 drives the control signal transmitter 16 on the basis of a channel selection signal which will be received when the user selects the channel in the remote control transmitter 28, and transmits to the retransmitter 14 information indicating which channel is selected (which frequency should be selected and passed). Similarly, the control signal transmitter 16 is driven, thereby making it possible to feed to the retransmitter 14 signals for carrying out ON/OFF control of the power switch 11 and gain control of the variable gain amplifier 7.

Description is now made of receiving processing by a digital broadcasting receiving system. As the setting of such a system, the installation of the retransmitter 14 is first adjusted. In the adjustment of the installation, a plane of polarization of the indoor receiving antenna 1 coincides with the direction of polarization of the direct digital broadcasting wave from the broadcasting station (consequently, the direction of polarization of a retransmitted wave is perpendicular to the direction of polarization of the direct digital broadcasting wave). Further, the direction of polarization of the direct digital broadcasting wave from the broadcasting station is registered in the digital broadcasting receiver 17 so that the plane of polarization of radio waves to be received by the indoor antenna 15 can be recognized when the direction of polarization of the indoor antenna 15 is switched in order to select and receive the direct wave and the retransmitted wave. When the direct digital broadcasting wave from the transmitting station is a horizontally polarized wave, for example, the retransmitted wave is a vertically polarized wave. Therefore, the digital broadcasting receiver 17 performs processing for employing the receiving signal from the second element 15*b* in the indoor antenna 15 when it receives the retransmitted wave, while performing processing for employing the receiving signal from the first element 15*a* when it receives the direct wave which is a horizontally polarized wave.

When the digital broadcasting receiver 17 is turned on, an instruction to turn on the power to the retransmitter 14 is not issued at the beginning, and the receiving of the direct digital broadcasting wave from the transmitting station is tried by the indoor receiving antenna 15. At this time, the direct wave which is a horizontally polarized wave is received. Therefore, the receiving signal from the first element 15*a* is employed, and the value of the quality of the receiving signal at this time is stored in the memory 32. The digital broadcasting receiver 17 then transmits a signal to be a command to turn on the power, a signal indicating which channel is selected, and so on to the retransmitter 14. Further, switching processing is performed such that the receiving signal from the second element 15*b* is employed.

The retransmitter 14 receives the above-mentioned signal in the control signal receiver 9. The control signal demodulator 10 demodulates the above-mentioned signal to grasp the contents of control, to turn on the power switch 11 as well as generate a control voltage corresponding to the center frequency of the channel selection filter 6 in correspondence with the selected channel. Further, a control voltage for the variable gain amplifier 7 for determining the level of a transmission output is also generated. By such processing, out of broadcasting waves received in the indoor receiving antenna 1, the broadcasting wave on the channel which will be received by the digital broadcasting receiver 17 is transmitted from the retransmission indoor antenna 13 as a broadcasting wave which is a polarized wave perpendicular to the indoor receiving antenna 1.

The digital broadcasting receiver 17 receives the broadcasting wave from the retransmitter 14 in the second element 15b, to acquire the value of the receiving quality thereof. A control signal is transmitted to the retransmitter 14 so as to control transmission power from the variable gain amplifier 7 such that the value of the receiving quality of the broadcasting wave from the retransmitter 14 is the best while comparing the value of the receiving quality of the broadcasting wave from the retransmitter 14 and the value of the receiving quality of the direct wave already stored in the memory 32. When there is no case where the value of the receiving quality of the broadcasting wave from the retransmitter 14 exceeds the value of the receiving quality of the direct wave already stored in the memory 32, the digital broadcasting receiver 17 feeds a command signal for turning off the power to the retransmitter 14 such that the power switch 11 is turned off in order to perform direct receiving from the transmitting station without using the retransmitter 14. The digital broadcasting receiver 17 employs the first element 15a in the indoor receiving antenna 15 to change the direction of polarization of the indoor receiving antenna 15 for the purpose of receiving the direct broadcasting wave. On the other hand, when the value of the receiving quality of the broadcasting wave from the retransmitter 14 exceeds the value of the receiving quality of the direct wave stored in the memory 32, the retransmitter 14 remains in a state where the power thereto is turned on, and the indoor antenna 15 remains in a state where the second element 15b is employed.

When a viewer operates the remote control transmitter 28 to change the channel, processing for selecting one of the elements in the indoor receiving antenna 15 and acquiring the quality of the receiving signal of the digital broadcasting wave from the retransmitter 14, processing for selecting the other element and acquiring the quality of the receiving signal of the digital broadcasting wave from the transmitting station, and processing for comparing the qualities of both the receiving signals and judging which of the digital broadcasting waves is to be employed are performed, as in the foregoing.

When the viewer turns off the power to the digital broadcasting receiver 17 or switches the broadcasting receiving mode into a mode for receiving a broadcasting wave other than a terrestrial wave, for example, a satellite system or a cable, the digital broadcasting receiver 17 feeds a control signal by the control signal transmitter 16 to turn off the power switch 11 in the retransmitter 14.

If it is judged once which of the direct wave and the retransmitted wave is preferable with respect to each of the channels, the judgment may be registered in the memory 32 in the digital broadcasting receiver 17, not to perform an operation for selecting and confirming preferable receiving conditions of the direct wave/retransmitted wave at the time of changing the channel. It is considered that such a period during which the selecting and confirming operation is not performed is a period to the next day or to the time when one week has elapsed, to the time when a reconfirmation command is next issued to the digital broadcasting receiver 17 by the user, or the like. The operation for selecting and confirming the preferable receiving conditions of the direct wave/retransmitted wave may be performed along with the existent station channel search made when the system is installed or after the user moves into a new house. When an area where the system is installed is found, and the receiving conditions of radio waves in the area are found, it may be previously found which of the direct wave and the retransmitted wave is preferable with respect to each of the channels. In such a case, information may be registered in the memory 32 in the digital broadcasting receiver 17 without performing a selecting and confirming operation.

When a stable receiving signal is introduced into a house by a cable from an antenna installed outdoors, the outdoor antenna may be connected to an external antenna input terminal 2, to switch the switch 3 toward the external antenna input terminal 2.

As described in the foregoing, the retransmitter 14 does not retransmit all broadcasting waves in a broadcasting band but synchronizes with a channel to be received by the digital broadcasting receiver 17 to selectively retransmit only a frequency band on the received channel, thereby making it possible to reduce coupling between transmission and receiving units. In the present embodiment, the retransmission indoor antenna 13 and the indoor receiving antenna 1 are arranged with the conductor 18 interposed therebetween such that the respective directions of transmission are opposite to each other, and the respective directions of transmission and receiving can be made to actually differ from each other by 180 degrees, although transmission and receiving points come close to each other, thereby making it possible to reduce the detouring of a transmitted wave and a received wave. Further, in the present embodiment, the respective directions of polarization of the indoor receiving antenna 1 and the retransmission indoor antenna 13 are perpendicular to each other. Accordingly, the transmitted wave and the received wave are easy to separate, thereby making it possible to suppress oscillation.

As described in the foregoing, according to the present invention, even when the digital broadcasting receiver is installed in a place spaced apart from a window, stable receiving can be performed using the indoor receiving antenna by a retransmitted wave from the retransmitter. The retransmitter makes retransmission without changing a frequency from the transmitting station. Therefore, the necessity of replacing service information is eliminated, thereby making it possible to simplify circuits constituting the retransmitter.

The invention claimed is:
1. A retransmitter characterized by comprising:
a high-frequency input unit to which a receiving antenna for receiving a digital broadcasting wave is connected;
a high-frequency output unit to which a retransmission antenna for retransmitting the digital broadcasting wave is connected;
a section for acquiring a frequency selection signal which is a signal fed from a digital broadcasting receiver, said frequency selection signal corresponds to indication as to a channel that is selected by the digital broadcasting receiver; and
a selecting and feeding section for selecting, by a selection filter, out of high-frequency signals inputted from said high-frequency input unit, a high-frequency signal having a frequency corresponding to said frequency selection signal and feeding the selected high-frequency signal to said high-frequency output unit, said selecting and feeding section comprises a first gain controller for making the level of the high-frequency signal inputted from the high-frequency input unit constant, a pass frequency variable filter for selecting the high-frequency signal having the frequency corresponding to the frequency selection signal, and a second gain controller for controlling transmission power of the selected high-frequency signal, and a section for acquiring a gain control signal fed from said digital broadcasting receiver and feeding a control signal to the second gain controller, and that the transmission power of the high-frequency signal is controlled by the second gain controller under control from said digital broadcasting receiver;

wherein the digital broadcasting wave, on the selected channel, having the frequency corresponding to said frequency selection signal, is retransmitted by the high-frequency output unit without changing the frequency of said digital broadcasting wave on said selected channel.

2. In the retransmitter according to claim 1, the retransmitter characterized in that an indoor receiving antenna is mounted as the receiving antenna on said high-frequency input unit, the retransmission antenna is mounted on said high-frequency output unit, and the respective directions of polarization of the indoor receiving antenna and the retransmission antenna are perpendicular to each other.

3. A digital broadcasting receiving system comprising the retransmitter according to claim 2; and the digital broadcasting receiver having a section for feeding the signal to the retransmitter, characterized in that the digital broadcasting receiver comprises an indoor receiving antenna having a first receiving element for receiving the digital broadcasting wave which is a horizontally polarized wave and a second receiving element for receiving the digital broadcasting wave which is a vertically polarized wave, and a selecting and controlling section for performing processing for selecting one of the elements and acquiring the quality of the receiving signal of the digital broadcasting wave from the retransmitter, processing for selecting the other element and acquiring the quality of the receiving signal of the digital broadcasting wave from the transmitting station, and processing for comparing the qualities of both the receiving signals to judge which of the digital broadcasting waves is to be employed.

4. In the retransmitter according to claim 1 or 2, the retransmitter characterized in that an indoor receiving antenna is mounted as the receiving antenna on said high-frequency input unit, the retransmission antenna is mounted on said high-frequency output unit, and the indoor receiving antenna and the retransmission antenna are arranged with a conductor interposed therebetween such that the respective directions of transmission are opposite to each other.

5. In the retransmitter according to claim 1 or 2, the retransmitter characterized by further comprising a section for acquiring an ON/OFF control signal fed from said digital broadcasting receiver and a power switch, and by being turned on and off under control from said digital broadcasting receiver.

6. In the retransmitter according to claim 1 or 2, the retransmitter characterized in that a signal from said digital broadcasting receiver is received by wireless.

7. A digital broadcasting receiving system characterized by comprising:

the retransmitter according to claim 1 or 2; and the digital broadcasting receiver having a section for feeding the signal to the retransmitter.

8. In the digital broadcasting receiving system according to claim 7, the digital broadcasting receiving system characterized in that the digital broadcasting receiver comprises a selecting and controlling section for performing processing for acquiring the quality of a receiving signal of the digital broadcasting wave from the retransmitter, processing for acquiring the quality of a receiving signal of the digital broadcasting wave from a transmitting station, and processing for comparing the qualities of both the receiving signals to judge which of the digital broadcasting waves is to be employed.

9. The digital broadcasting receiving system according to claim 7, wherein the digital broadcasting receiver comprises a selecting and controlling section for performing processing for acquiring the quality of a receiving signal of the digital broadcasting wave from the retransmitter, processing for acquiring the quality of the receiving signal of the digital broadcasting wave from a transmitting station, and processing for comparing the qualities of both the receiving signals to judge which of the digital broadcasting waves is to be employed, and the digital broadcasting receiving system characterized by storing in a memory the results of the judgment for each of channels by said selecting and controlling section, and utilizing, when the channel for which the results of the judgment have already been stored is selected, the results of the judgment which have already been stored, to omit the processing for the judgment by the selecting and controlling section.

10. A retransmitter characterized by comprising:

a high-frequency input unit to which a receiving antenna for receiving a digital broadcasting wave is connected;

a high-frequency output unit to which a retransmission antenna for retransmitting the digital broadcasting wave is connected;

a section for acquiring a frequency selection signal which is a signal fed from a digital broadcasting receiver, said frequency selection signal corresponds to indication as to a channel that is selected by the digital broadcasting receiver;

a selecting and feeding section for selecting, out of high-frequency signals inputted from said high-frequency input unit, a high-frequency signal having a frequency corresponding to said frequency selection signal and feeding the selected high-frequency signal to said high-frequency output unit, said selecting and feeding section comprises a first gain controller for making the level of the high-frequency signal inputted from the high-frequency input unit constant, a pass frequency variable filter for selecting the high-frequency signal having the frequency corresponding to the frequency selection signal, and a second gain controller for controlling transmission power of the selected high-frequency signal, and a section for acquiring a gain control signal fed from said digital broadcasting receiver and feeding a control signal to the second gain controller, and that the transmission power of the high-frequency signal is controlled by the second gain controller under control from said digital broadcasting receiver;

wherein the digital broadcasting wave, on the selected channel, having the frequency corresponding to said frequency selection signal, is retransmitted by the high-frequency output unit without changing the frequency of said selected channel corresponding to the frequency selection signal, wherein said frequency selection signal is the signal fed from the digital broadcasting receiver.

11. A retransmitter characterized by comprising:
a high-frequency input unit to which a receiving antenna for receiving a digital broadcasting wave is connected;
a high-frequency output unit to which a retransmission antenna for retransmitting the digital broadcasting wave is connected;
a section for acquiring a frequency selection signal which is a signal fed from a digital broadcasting receiver, said frequency selection signal corresponds to indication as to a channel that is selected by the digital broadcasting receiver;
a selecting and feeding section for selecting, by a selection filter, out of high-frequency signals inputted from said high-frequency input unit, and a high-frequency signal having a frequency corresponding to said frequency selection signal and feeding the selected high-frequency signal to said high-frequency output unit, said selecting and feeding section comprises a first gain controller for making the level of the high-frequency signal inputted from the high-frequency input unit constant, a pass frequency variable filter for selecting the high-frequency signal having the frequency corresponding to the frequency selection signal, and a second gain controller for controlling transmission power of the selected high-frequency signal, and
a section for acquiring a gain control signal fed from said digital broadcasting receiver and feeding a control signal to the second gain controller, and that the transmission power of the high-frequency signal is controlled by the second gain controller under control from said digital broadcasting receiver;
wherein the digital broadcasting wave, on the selected channel, having the frequency corresponding to said frequency selection signal, is retransmitted by the high-frequency output unit without changing the frequency of selected channel corresponding to the frequency selection signal, wherein said frequency selection signal is the signal fed from the digital broadcasting receiver.

* * * * *